US008489566B2

(12) United States Patent
Guo et al.

(10) Patent No.: US 8,489,566 B2
(45) Date of Patent: Jul. 16, 2013

(54) OPTIMISTIC LOCKING IN ONLINE AND OFFLINE ENVIRONMENTS

(75) Inventors: Sherry Guo, Fremont, CA (US); Ryan Jerome Kern, Hillsboro, OR (US); Bilung Lee, San Jose, CA (US); Paul Arnold Ostler, Boise, ID (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/099,620

(22) Filed: Apr. 8, 2008

(65) Prior Publication Data

US 2009/0254556 A1 Oct. 8, 2009

(51) Int. Cl.
G06F 7/00 (2006.01)
G06F 17/00 (2006.01)

(52) U.S. Cl.
USPC .......................................... 707/704

(58) Field of Classification Search
USPC .......................................... 707/609, 705, 704
See application file for complete search history.

(56) References Cited

U.S. PATENT DOCUMENTS

| 5,983,226 | A  | * | 11/1999 | Commerford et al. | 707/610 |
| 6,178,421 | B1 | * | 1/2001  | Dahlen et al.     | 707/692 |
| 6,240,413 | B1 | * | 5/2001  | Learmont          | 707/698 |
| 6,330,560 | B1 |   | 12/2001 | Harrison et al.   |         |
| 6,401,103 | B1 | * | 6/2002  | Ho et al.         | 1/1     |
| 6,836,887 | B1 |   | 12/2004 | Such              |         |
| 6,850,938 | B1 | * | 2/2005  | Sadjadi           | 1/1     |
| 7,236,974 | B2 |   | 6/2007  | Bhattacharjee et al. |      |
| 7,593,943 | B2 | * | 9/2009  | Clarke et al.     | 1/1     |
| 7,707,194 | B2 | * | 4/2010  | Bresch et al.     | 707/704 |
| 7,774,319 | B2 | * | 8/2010  | Schweigkoffer et al. | 707/690 |
| 7,937,377 | B2 | * | 5/2011  | Wilding et al.    | 707/704 |
| 2002/0138483 | A1 |   | 9/2002  | Bretl et al.    |         |
| 2003/0200526 | A1 |   | 10/2003 | Arcand          |         |
| 2005/0138375 | A1 | * | 6/2005  | Sadjadi         | 713/167 |
| 2005/0177590 | A1 | * | 8/2005  | Chen et al.     | 707/102 |
| 2006/0036574 | A1 | * | 2/2006  | Schweigkoffer et al. | 707/2 |
| 2006/0143239 | A1 | * | 6/2006  | Battat et al.   | 707/201 |
| 2007/0118523 | A1 |   | 5/2007  | Bresch et al.   |         |

(Continued)

OTHER PUBLICATIONS

Q. Mao, J. Wang, Y. Zhan; The Optimistic Locking Concurrency Controlling Algorithm Based on Relative Position and Its Application in Real-Time Collaborative Editing System, The 8th International Conference on Computer Supported Cooperative Work in Design Proceedings, 2003, (7 pgs).

(Continued)

*Primary Examiner* — Robert Beausoliel, Jr.
*Assistant Examiner* — Michael Pham
(74) *Attorney, Agent, or Firm* — Toler Law Group, PC

(57) ABSTRACT

Systems and methods to implement optimistic locking in online and offline environments are provided. A particular method includes receiving from an application an application data request related to retrieving a data item from a data store. The method also includes sending an optimistic locking information request to the data store to retrieve optimistic locking information, such as an identifier, associated with the data item. Additionally, the method includes receiving a data item update statement from the application while a connection between the application and a database server coupled to the data store persists or after a connection between the application and the database server has terminated and reconnected. The data item update statement relates to storing an updated version of the data item at the data store. Further, the method includes synchronizing the data item with the updated version of the data item based on the optimistic locking information.

20 Claims, 6 Drawing Sheets

U.S. PATENT DOCUMENTS

2007/0185834 A1    8/2007  Dunn
2007/0198517 A1    8/2007  Bresch et al.
2007/0239751 A1*  10/2007  Wei et al. ................. 707/101
2008/0046676 A1*   2/2008  Peters ........................ 711/200
2009/0073870 A1*   3/2009  Haartsen et al. ............ 370/216
2009/0254556 A1*  10/2009  Guo et al. ..................... 707/8

OTHER PUBLICATIONS

U. Halici, A. Dogac; An Optimistic Locking Technique for Concurrency Control in Distributed Databases, IEEE Transactions on Software Engineering, vol. 17, No. 7, Jul. 1991 (13 pgs).

* cited by examiner

OPTIMISTIC LOCKING IN ONLINE AND OFFLINE ENVIRONMENTS

I. FIELD

The present disclosure is generally related to systems and methods of implementing optimistic locking in online and offline environments.

II. BACKGROUND

Data items stored in a database may be accessed by an application via a database server. For example, an application may send a statement to a database server to read a data item from the database. The statement may also indicate that the application may subsequently update the data item via a write operation. Database servers may utilize pessimistic locking to control access to data items stored in a database. In pessimistic locking, an exclusive lock is obtained with respect to a data item when the database server receives a statement related to reading and/or updating the particular data item. An exclusive lock of a particular data item begins at the initial read of the data item and persists until the time that the update occurs or until the application releases the data item without making an update. During an exclusive lock, other applications are not able to access the data item. For example, a database server will not permit access to another application attempting to read or update a data item associated with an exclusive lock. Restricting access to a data item using pessimistic locking can create a backlog of applications requesting access to the data item.

Database servers may also utilize optimistic locking to control access to data items stored in a database. Optimistic locking allows an application to obtain a shared lock during an initial read and does not involve obtaining an exclusive lock on the data item until the application makes the update to the data item. During a shared lock, other applications may also access a data item for a read operation, but write operations are executed after obtaining an exclusive lock for a particular data item. At the time of an update, a database server utilizing optimistic locking determines if the data item has been changed from the initial read. If the data item has changed, then the update will fail. Otherwise, the database server executes the update statement.

In both pessimistic locking and optimistic locking, the application remains online with respect to the database server, that is, a connection between the application and the database server persists from the time of the initial read until the time of an update or until the application releases the data item without making an update. If the application goes offline with respect to the database server, that is, the connection between the application and the database server terminates, then a pending read or update operation with respect to a particular data item is re-submitted. A persistent connection between the application and the database server for each read and/or update operation limits the number of applications that can open connections with the database server to update a data item stored in a particular database. Additionally, when an update is to be made by an application with respect to a data item, the application separately requests optimistic locking information, such as a time stamp or version number, from a database associated with the data item to execute a subsequent update to the data item.

III. SUMMARY

A system is disclosed that includes an enablement interface adapted to receive an application data request from an application. The application data request is adapted to retrieve a data item stored at a data store. The enablement interface is also adapted to automatically add an optimistic locking information request to the application data request. The optimistic locking information request is adapted to retrieve optimistic locking information associated with the data item and the optimistic locking information includes an identifier related to the data item. Additionally, the system includes a retrieval interface adapted to retrieve the data item and the optimistic locking information from the data store and forward the data item and the optimistic locking information to the application. Further, the system includes an online update interface adapted to receive a data item update statement from the application. The data item update statement is related to storing an updated version of the data item at the data store. The online update interface is also adapted to synchronize the data item stored at the data store with the updated version of the data item based on the optimistic locking information. The system also includes an offline update interface adapted to receive a data item update statement from the application after a connection between the application and a database server coupled to the data store is re-established and receive the optimistic locking information associated with the data item from the application. The offline update interface is also adapted to synchronize the data item stored at the data store with the updated version of the data item based on the optimistic locking information.

IV. BRIEF DESCRIPTION OF THE DRAWINGS

V. DETAILED DESCRIPTION

Figure 1:
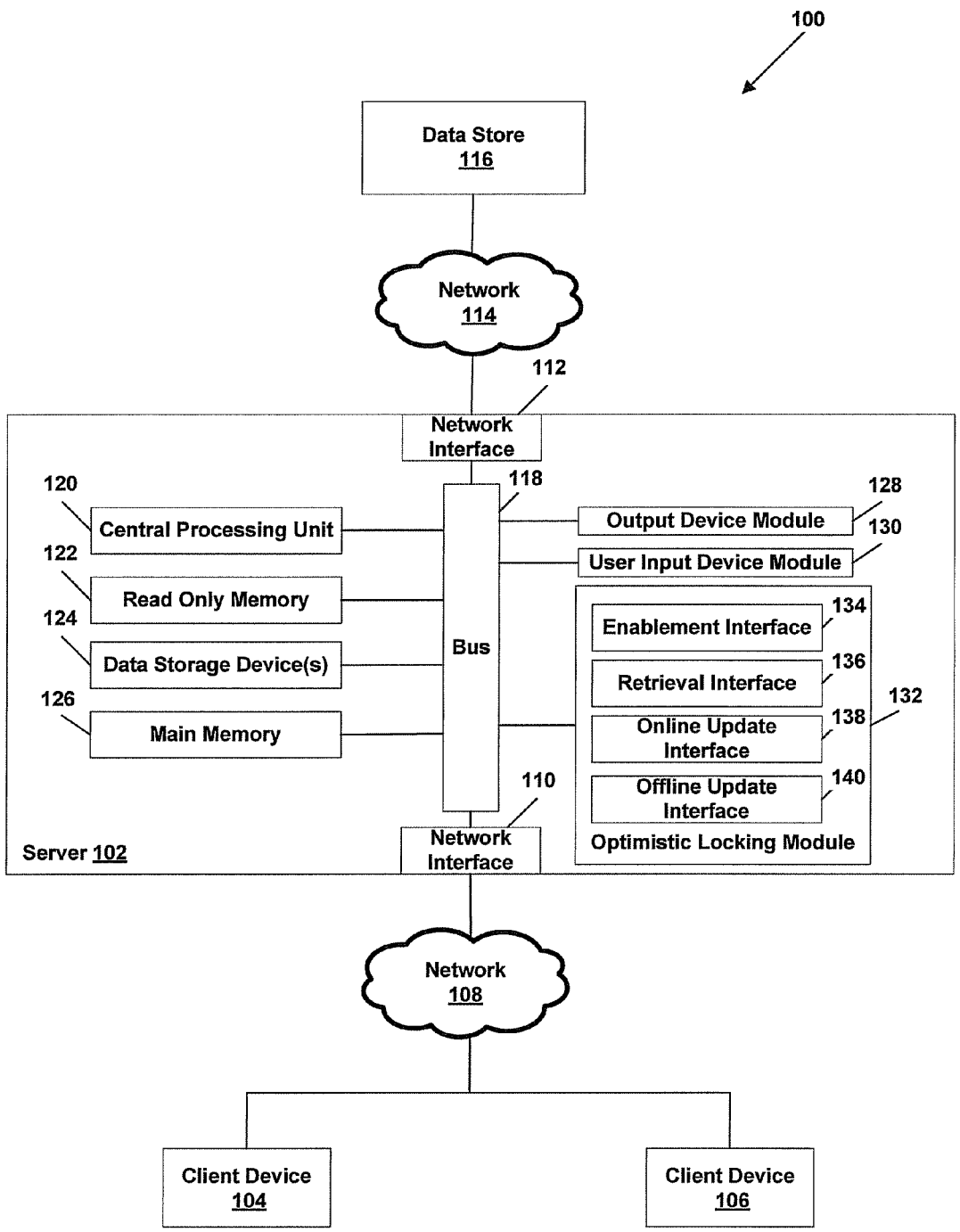
FIG. 1 is a diagram of a particular embodiment of a three-tiered system to implement optimistic locking in online and offline environments.

FIG. 1 is a diagram of a particular embodiment of a three-tiered system 100 that implements optimistic locking in online and offline environments. The system 100 includes a server 102 that is adapted to communicate with client devices, such as a first representative client device 104 and a second representative client device 106, via a first network 108. The client devices 104, 106 may include a personal computing device, a server, or a mobile computing device, such as a hand-held computing device, a mobile phone, or a laptop computer. The first network 108 may include a local area network, a wide area network, an Internet Protocol network, a wireless network, a wireline network, or any combination thereof. Although FIG. 1 illustrates the representative client devices 104, 106, various numbers of client devices may communicate with the server 102 via the first network 108.

The server 102 is also adapted to communicate with a data store 116 coupled to the server 102 via a second network 114. The second network 114 may include a local area network, a wide area network, an Internet Protocol network, a wireless network, a wireline network, or any combination thereof. In an illustrative, non-limiting embodiment, the data store 116 may include one or more databases stored on one or more data storage devices.

The server 102 includes a first network interface 110 to communicate with the first network 108 and a second network interface 112 to communicate with the second network 114. The network interfaces 110, 112 may include one or more connections, where each connection is dedicated to a particular client device 104, 106 or to a particular component of the data store 116. In addition, the network interfaces 110, 112 may include software instructions, hardware, or any combination thereof. The server 102 also includes processing logic, such as a central processing unit (CPU) 114, a read-only memory (ROM) 116, and one or more data storage devices 118, such as one or more hard disk drives. Additionally, the server 102 includes a main memory 126, such as a random access memory (RAM) and an output device module 128 including computer readable instructions adapted to manage the operation of one or more output devices coupled to the server 102, such as a video output device, an audio output device, or any combination thereof. Further, the server 102 includes a user input device module 130 that includes software instructions adapted to manage the operation of one or more user input devices, such as a keyboard, a mouse, or a touch screen display. The server 102 includes an optimistic locking module 132 and a bus 118 that controls communications between the CPU 120, the ROM 122, the one or more data storage devices 124, the main memory 126, the output device module 128, the user input device module 130, the optimistic locking module 132, and the network interfaces 110, 112.

The optimistic locking module 132 is adapted to utilize optimistic locking to retrieve a data item from the data store 116 and store an updated version of the data item at the data store 116 in an online environment or in an offline environment. The optimistic locking module 132 includes an enablement interface 134, a retrieval interface 136, an online update interface 138, and an offline update interface 140. The enablement interface 134 is adapted to receive an application data request related to retrieving a data item from the data store 116 from an application and to append an optimistic locking information request to the application data request. The optimistic locking information request is adapted to retrieve optimistic locking information associated with the data item from the data store 116. The retrieval interface 136 is adapted to retrieve the requested data item and the requested optimistic locking information from the data store 116 and forward the data item and optimistic locking information to the requesting application. The online update interface 138 is adapted to synchronize an updated version of the data item received from the application with the data item stored at the data store 116 based on the optimistic locking information. The offline update interface 140 is adapted to determine when a connection between an application and a database server coupled to the data store 116 has been terminated. Further, the offline update interface 140 is adapted to synchronize an updated version of the data item received from the application with the data item stored at the data store 116 based on the optimistic locking information after the connection between the application and the database server has been re-established.

Applications executable via the client devices 104, 106, via the server 102, or any combination thereof, may be adapted to request data items stored at the data store 116 and modify the requested data items. In one example, an application may be adapted to retrieve an account balance of a particular bank customer and modify the account balance based on a transaction related to the customer. In another example, an application may retrieve information related to an employee of a particular company and modify the employee information after the employee has received a promotion or changed positions within the company.

In an illustrative embodiment, the server 102 may function as a database server that is adapted to access data items stored at the data store 116 via a database driver (not shown). In an illustrative, non-limiting embodiment, the database driver may include the optimistic locking module 132. When the server 102 functions as a database server, the server 102 may receive an application data request from an application executed by a client device, such as the first client device 104. Additionally, when the server 102 functions as a database server, the server 102 may receive an application data request from an application executed by an application server (not shown) coupled to the first network 108. The application data request may be sent by an application residing on the application server in response to one or more commands received from a client device, such as the first client device 104, via a web browser executed on the first client device 104.

In another illustrative embodiment, the server 102 may function as an application server that is adapted to provide the client devices 104, 106 with access to the data store 116 via the Internet. The application server may include one or more applications (not shown) that are adapted to utilize data items stored at the data store 116. The one or more applications may be responsive to commands received from a web browser executed at a client device, such as the client device 104. When the server 102 functions as an application server, the second network 114 may include a database server (not shown) adapted to manage access to the data store 116.

Figure 2:
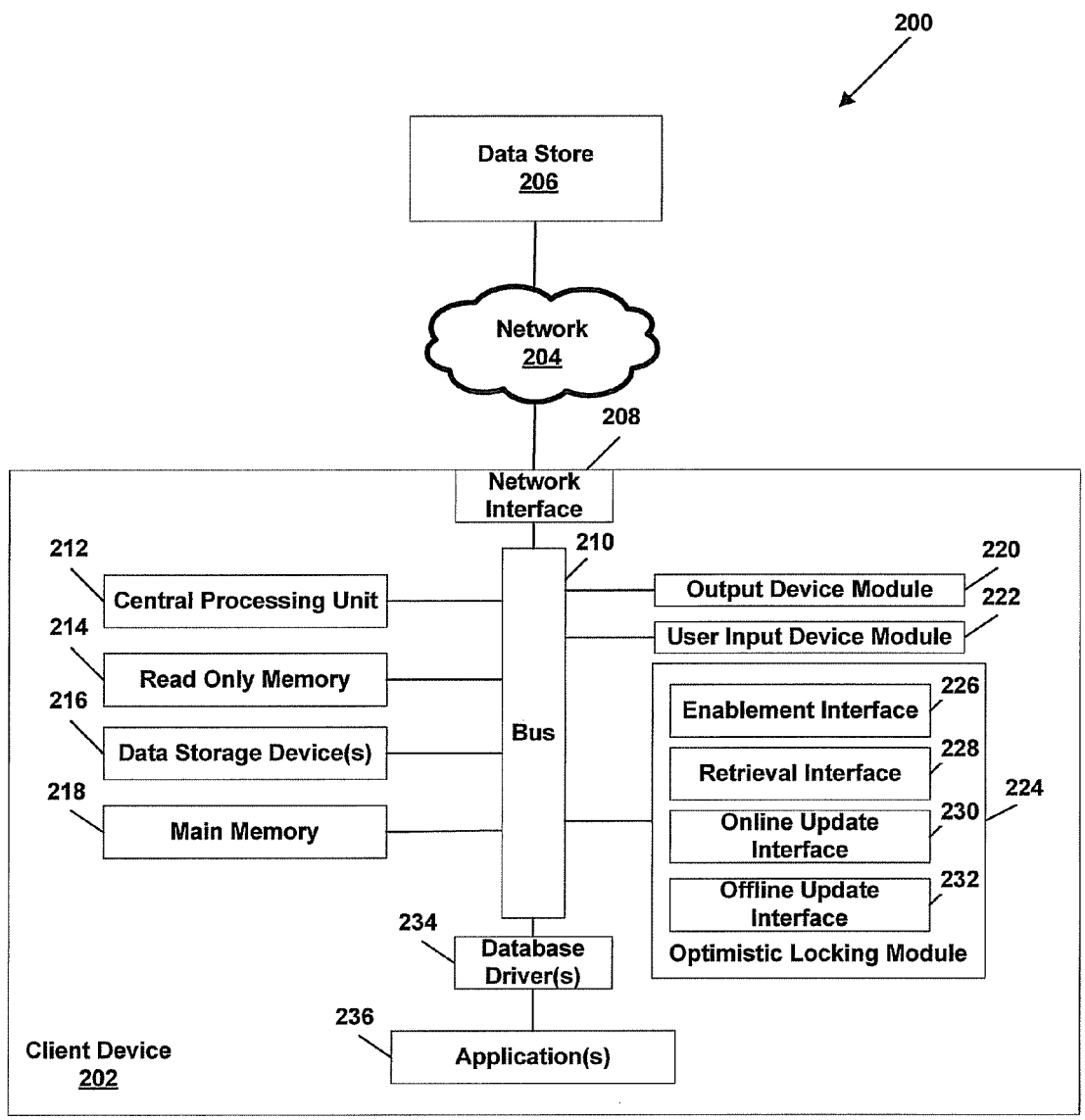
FIG. 2 is a diagram of a particular embodiment of a two-tiered system to implement optimistic locking in online and offline environments.

FIG. 2 is a diagram of a particular embodiment of a two-tiered system 200 to implement optimistic locking in online and offline environments. The system 200 includes a client device 202 that is adapted to communicate with a data store 206 via a network 204. The client device 202 may include a personal computing device, a server, or a mobile computing device, such as a hand-held computing device, a mobile phone, or a laptop computer. The network 204 may include a local area network, a wide area network, an Internet Protocol network, a wireless network, a wireline network, or any combination thereof.

The client device 202 includes a network interface 208 to communicate with the network 204. The network interface 208 may include one or more connections, where each connection is dedicated to a particular component of the data store 206. The client device 202 also includes processing logic, such as a central processing unit (CPU) 212, a read-only memory (ROM) 214, and one or more data storage devices 216, such as one or more hard disk drives. Additionally, the client device 202 includes a main memory 218, such as a random access memory (RAM) and an output device module 220 including software instructions adapted to manage the operation of one or more output devices coupled to the client device 202, such as a video output device, an audio output device, or any combination thereof. Further, the client device 202 includes a user input device module 222 that includes software instructions adapted to manage the operation of one or more user input devices, such as a keyboard, a mouse, or a touch screen display. The client device 202 includes an optimistic locking module 224 and a bus 210 that controls communications between the CPU 212, the ROM 214, the one or more data storage devices 216, the main memory 218, the output device module 220, the user input device module 222, the optimistic locking module 224, and the network interface 208.

The client device 202 also includes one or more database drivers 234 and one or more applications 236. The one or more database drivers 234 are adapted to provide the one or more applications 236 access to the data store 206. Each of the one or more database drivers 234 may be adapted to provide access to a respective database format. The one or more applications 236 may be adapted to retrieve and modify data items stored in the data store 206.

The optimistic locking module 224 is adapted to utilize optimistic locking to retrieve a data item from the data store 206 and store an updated version of the data item at the data store 206 in an online environment or in an offline environment. The optimistic locking module 224 includes an enablement interface 226, a retrieval interface 228, an online update interface 230, and an offline update interface 232. The enablement interface 226 is adapted to receive an application data request from a particular application of the one or more applications 236, where the application data request is related to retrieving a data item from the data store 206. Further, the enablement interface 226 is adapted to append an optimistic locking information request to the application data request. The optimistic locking information request is adapted to retrieve optimistic locking information associated with the data item from the data store 206. The retrieval interface 228 is adapted to retrieve the requested data item and the requested optimistic locking information from the data store 206 and forward the data item and optimistic locking information to the requesting application. The online update interface 230 is adapted to synchronize an updated version of the data item received from the particular application with the data item stored in the data store 206 based on the optimistic locking information. The offline update interface 232 is adapted to determine when a connection between the requesting application and a database server (not shown) coupled to the data store 206 has been terminated. Further, the offline update interface 232 is adapted to synchronize an updated version of the data item received from the particular application with the data item stored in the data store 206 based on the optimistic locking information after the connection between the particular application and the database server has been re-established.

Figure 3:
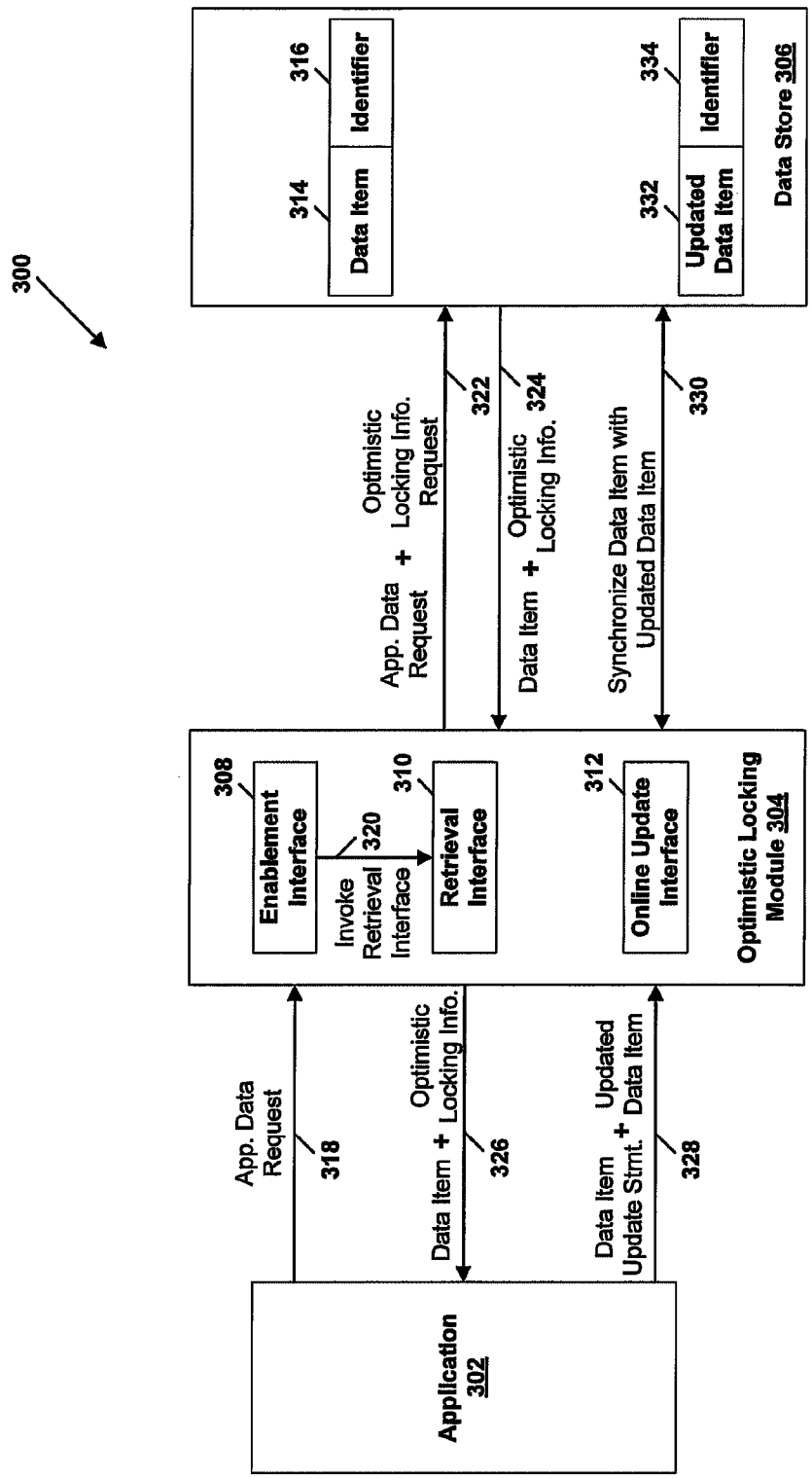
FIG. 3 is a diagram of a particular embodiment of a system to implement optimistic locking in an online environment.

FIG. 3 is a diagram of a particular embodiment of a system 300 to implement optimistic locking in an online environment. The system 300 includes an application 302, an optimistic locking module 304, and a data store 306. The application 302 may be executable by processing logic of a client device, an application server, a database server, or any combination thereof, such as the client devices 104, 106 and the server 102 of FIG. 1 or the client device 202 of FIG. 2. Additionally, the optimistic locking module 304 may be executable by processing logic of a client device, an application server, a database server, or any combination thereof. In an illustrative, non-limiting embodiment, the optimistic locking module 304 may be included in a database driver, such as an open database connectivity (ODBC) driver. The data store 306 may include one or more databases of one or more formats. For example, the data store 306 may include a relational database, such as a structured query language (SQL) database, a navigational database, or any combination thereof.

The optimistic locking module 304 includes an enablement interface 308, a retrieval interface 310, and an online update interface 312. In a particular embodiment, the enablement interface 308 receives an application data request at 318 from the application 302. The application data request is adapted to retrieve a data item, such as the data item 314, from the data store 306. After receiving the application data request, the enablement interface 308 is adapted to automatically add an optimistic locking information request to the application update request. In an illustrative embodiment, the application data request may include at least a string indicating a request to modify the data item 314 via the application 302 and the enablement interface 308 may be adapted to append an additional string to the application data request, where the additional string is related to obtaining optimistic locking information associated with the data item 314. The optimistic locking information may include an identifier of the data item, such as the first identifier 316 of the data item 314. The first identifier 316 may include a time stamp or a version number of the data item 314. A time stamp of the data item 314 may indicate a time when a latest update of the data item 314 occurred. A version number associated with the data item 314 may be incremented each time that the data item 314 is updated.

After appending the optimistic locking information request to the application data request, the enablement interface 308 is adapted to invoke the retrieval interface 310 at 320. The retrieval interface 310 is adapted to obtain a shared lock with respect to the requested data item 314 and send the application data request and the optimistic locking information request to the data store 306 at 322. In response to sending the application data request and the optimistic locking information request to the data store, the retrieval interface 310 is adapted to receive the requested data item 314 and the corresponding first identifier 316 from the data store 306. After receiving the data item 314 and the first identifier 316 from the data store 306, the retrieval interface 310 may be adapted to store the first identifier 316 in a memory device for subsequent recall during an update operation. The memory device may reside on the same computing device as the optimistic locking module 304, such as a client device, an application server, or a database server. The memory device may include the read only memory 122, the one or more data storage devices 124, or the main memory 126 of FIG. 1 or the read only memory 214, the one or more data storage devices 216, or the main memory 218 of FIG. 2. The retrieval interface 310 is further adapted to forward the data item 314 and the first identifier 316 to the application 302 at 326.

The online update interface 312 is adapted to receive a data item update statement and an updated data item from the application 302 at 328. The data item update statement is related to storing an updated version of the data item at the data store 306. In an illustrative embodiment, the data item 314 is modified by the application 302 to generate the updated version of the data item. In response to receiving the data item update statement and the updated version of the data item from the application 302, the online update interface 312 is adapted to obtain an exclusive lock with respect to the data item 314. The online update interface 312 is adapted to synchronize the data item 314 with the updated version of the data item based on the first identifier 316 at 330. For example, the online update interface 312 may be adapted to retrieve the first identifier 316 from a memory device and subsequently retrieve the data item 314 from the data store 306 based on the first identifier 316. The online update interface 312 may then be adapted to execute a write statement received from the application 302 with respect to the data item 314. After executing the write statement with respect to the data item 314, the online update interface 312 may be adapted to store the updated data item 332 at the data store 306 with a second identifier 334, where the second identifier 334 is different than the first identifier 316. To illustrate, when the first identifier 316 is a version number, the version number of the data item 314 may be incremented to generate the second identifier 334. In another illustration, when the first identifier 316 is a time stamp, the time stamp of the data item 314 may be replaced by a time stamp related to the time when the data item 314 is synchronized with the updated version of the data item to generate the second identifier 334.

Figure 4:
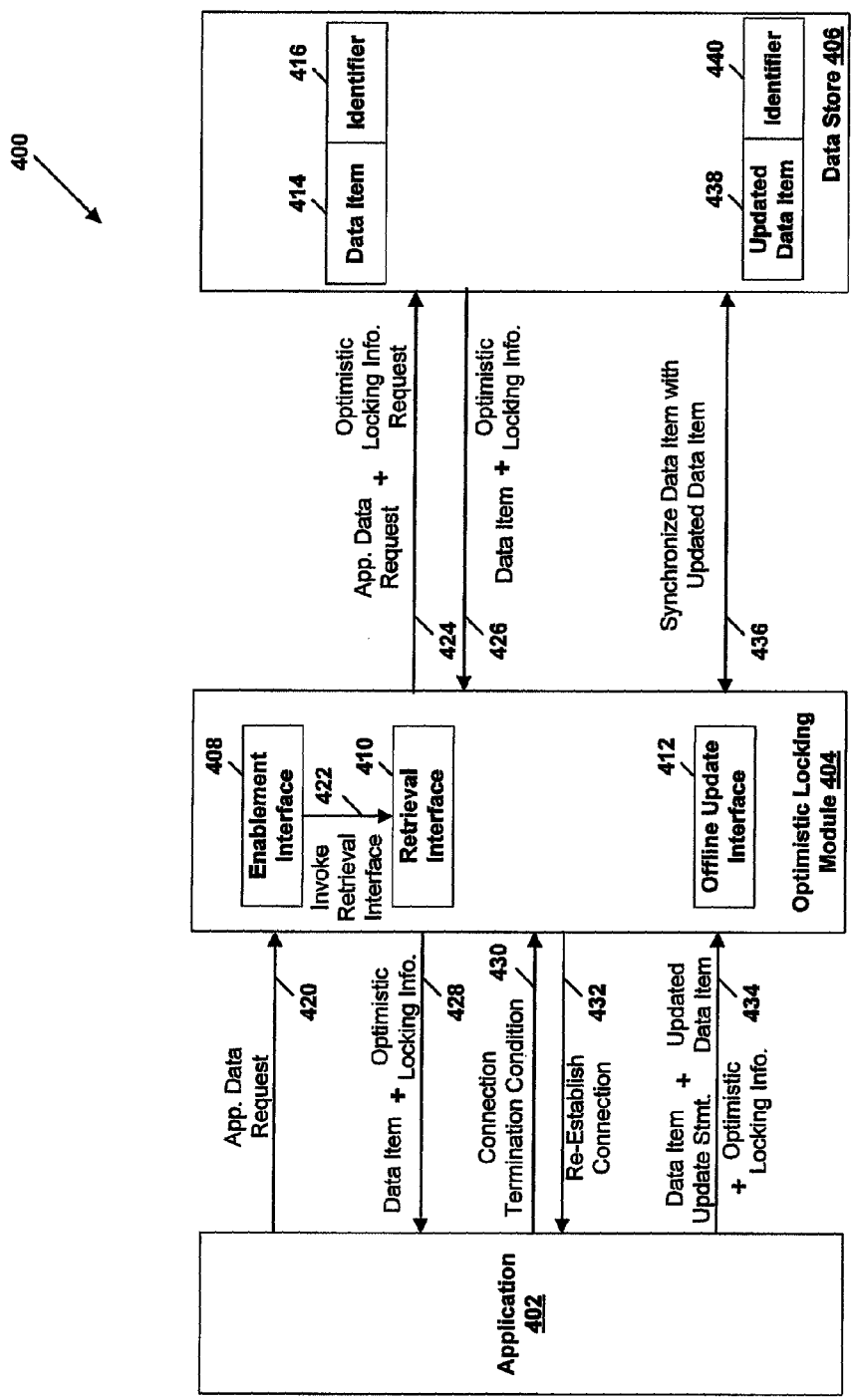
FIG. 4 is a diagram of a particular embodiment of a system to implement optimistic locking in an offline environment.

FIG. 4 is a diagram of a particular embodiment of a system 400 to implement optimistic locking in an offline environment. The system 400 includes an application 402, an optimistic locking module 404, and a data store 406. The application 402 may be executable by processing logic of a client device, an application server, a database server, or any combination thereof, such as the client devices 104, 106 and the server 102 of FIG. 1 or the client device 202 of FIG. 2. Additionally, the optimistic locking module 404 may be executable by processing logic of a client device, an application server, a database server, or any combination thereof. In an illustrative, non-limiting embodiment, the optimistic locking module 404 may be included in a database driver. The data store 406 may include one or more databases of one or more formats The optimistic locking module 404 includes an enablement interface 408, a retrieval interface 410, and an offline update interface 412. In a particular embodiment, the enablement interface 408 receives an application data request at 420 from the application 402. The application data request is adapted to retrieve a data item, such as the data item 414, from the data store 406. After receiving the application data request, the enablement interface 408 is adapted to automatically add an optimistic locking information request to the application update request 420. The optimistic locking information may include an identifier of the data item, such as the first identifier 416 of the data item 414. The first identifier 416 may include a time stamp or a version number of the data item 414.

After appending the optimistic locking information request to the application data request, the enablement interface 408 is adapted to invoke the retrieval interface 410 at 422. The retrieval interface 410 is adapted to obtain a shared lock with respect to the requested data item 414 and send the application data request and the optimistic locking information request to the data store 406 at 424. In response to sending the application data request and the optimistic locking information request to the data store 406, the retrieval interface 410 is adapted to receive the requested data item 414 and the corresponding first identifier 416 from the data store 406. The retrieval interface 410 is further adapted to forward the data item 414 and the first identifier 416 to the application 402 at 428.

After the data item 414 and the first identifier 416 have been sent to the application 402 via the optimistic locking module 404, the optimistic locking module 404 identifies that a connection termination condition between the application 402 and a database server coupled to the data store 406 occurs at 430. The termination condition may include a first termination condition associated with a client device coupled to the database server, a second termination condition associated with an application server coupled to the database server, or a third termination condition associated with the database server. For example, a connection between the application 402 and the database server may be terminated by the application 402 or by an event external to the application 402, such as a device failure of an application server, a device failure of the database server, a network failure, or any combination thereof. In an illustrative, non-limiting embodiment, the connection between the application 402 and a database server coupled to the data store 406 is disconnected after closing the data item 414 in the application 402. The connection between the application 402 and the database server may be disconnected for a period of time ranging from a fraction of a second to several hours or longer. During the period of time that the application 402 is disconnected from the data store 406, the application 402 may utilize and manipulate the retrieved data item 414. In addition, the data item 414 may be opened and closed a number of times within the application 402 while the connection between the application 402 and the database server is terminated.

At 432, the optimistic locking module 404 identifies that the connection between the application 402 and a database server coupled to the data store 406 is re-established. After the connection between the application 402 and the database server has been re-established, the offline update interface 412 receives a data item update statement, an updated version of the data item, and the optimistic locking information from the application at 434. The data item update statement is related to storing an updated version of the data item at the data store 406. In an illustrative embodiment, the data item 414 is modified by the application 402 to generate the updated version of the data item.

In response to receiving the data item update statement, the updated version of the data item, and the optimistic locking information associated with the data item 414 from the application 402, the offline update interface 412 is adapted to obtain an exclusive lock with respect to the data item 414. Further, the offline update interface 412 is adapted to synchronize the data item 414 at the data store 406 with the updated version of the data item received from the application 402 based on the first identifier 416 at 436. For example, the offline update interface 412 may be adapted to retrieve the data item 414 from the data store 406 based on the first identifier 416 received from the application 402. The offline update interface 412 may then be adapted to execute a write statement received from the application 402 with respect to the data item 414. After executing the write statement with respect to the data item 414, the offline update interface 412 may be adapted to store the updated data item 438 at the data store 406 with a second identifier 440, where the second identifier 440 is different than the first identifier 416.

Figure 5A:
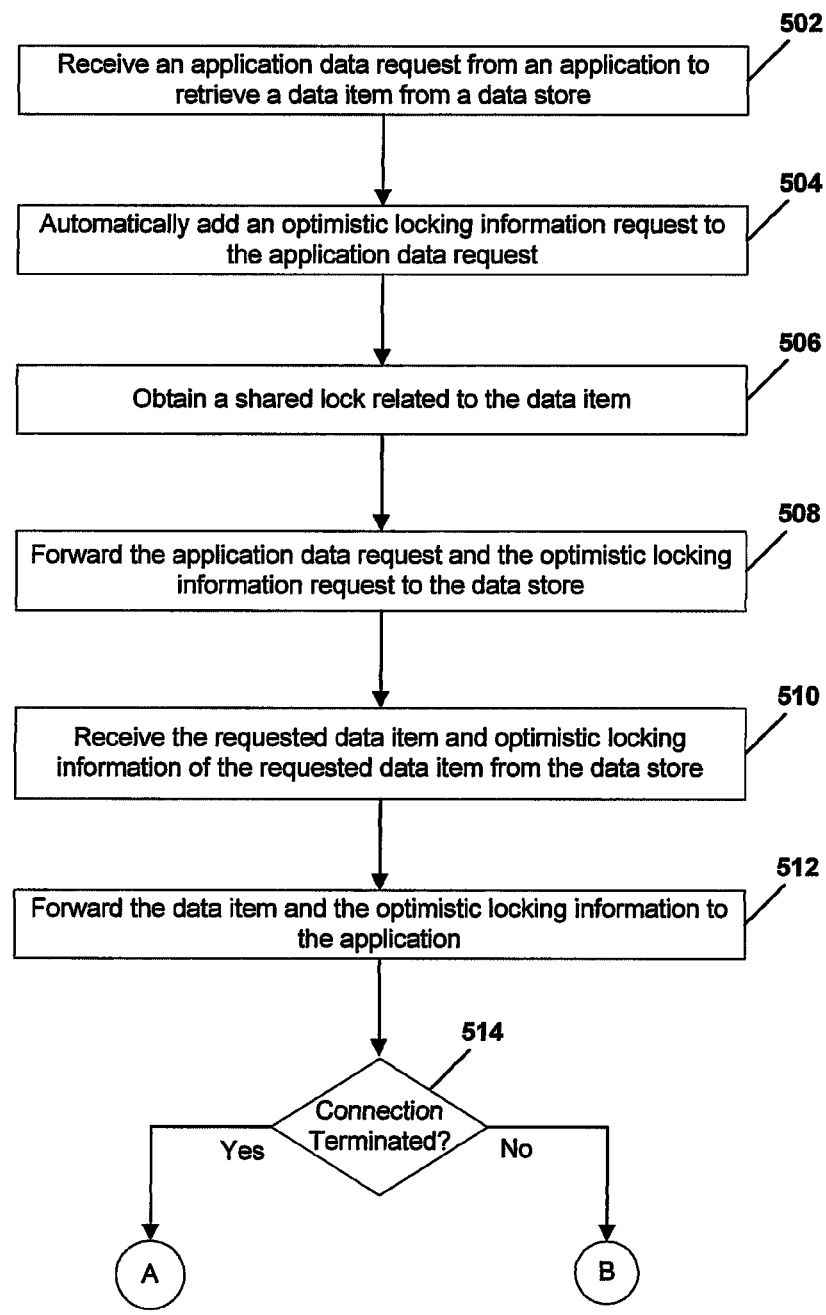
FIG. 5A is a flow diagram of a first portion of a particular embodiment of a method to implement optimistic locking in online and offline environments.

FIG. 5A is a flow diagram of a first portion of a particular embodiment of a method to implement optimistic locking in online and offline environments. The method may be executed by an optimistic locking module, such as the optimistic locking module 132 of FIG. 1, the optimistic locking module 224 of FIG. 2, the optimistic locking module 304 of FIG. 3, or the optimistic locking module 404 of FIG. 4. At 502, an application data request is received from an application to retrieve a data item from a data store. The application data request is adapted to retrieve a data item stored at a data store that is coupled to a database server. Moving to 504, an optimistic locking information request is automatically added to the application data request. The optimistic locking information request is adapted to retrieve optimistic locking information associated with the data item, such as a time stamp or version number, from the data store. Proceeding to 506, a shared lock is obtained with respect to the requested data item.

At 508, the application data request and the optimistic locking information request are forwarded to the data store. Moving to 510, the requested data item and optimistic locking information of the requested data item are received from the data store. In some embodiments, the optimistic locking information may be stored in a memory device for subsequent recall during an update of the data item. Proceeding to 512, the data item and the optimistic locking information are forwarded to the application. Advancing to 514, a determination is made as to whether a connection between the application and a database server coupled to the data store has been terminated. When the connection has been terminated, the method proceeds to A and when the connection is not terminated, that is, the application remains online with respect to the database server, the method proceeds to B.

Figure 5B:
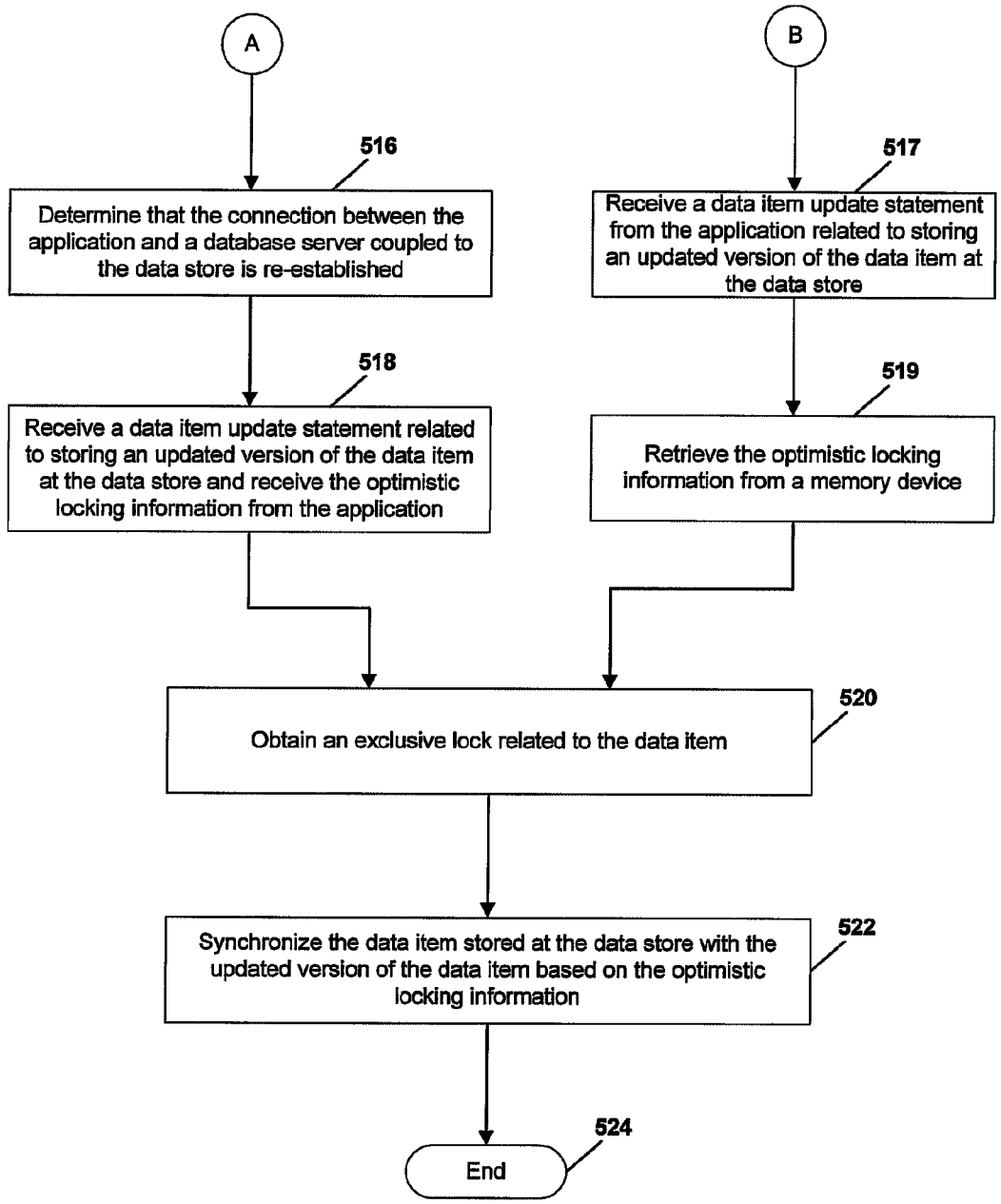
FIG. 5B is a flow diagram of a second portion of the particular embodiment of the method to implement optimistic locking in online and offline environments shown in FIG. 5A.

FIG. 5B is a flow diagram of a second portion of the particular embodiment of the method to implement optimistic locking in online and offline environments shown in FIG. 5A. From A, the method advances to 516. At 516, the connection between the application and the database server coupled to the data store is re-established. Moving to 518, a data item update statement and the optimistic locking information associated with the data item are received from the application. The data item update statement is related to storing an updated version of the data item at the data store. The method proceeds to 520.

From B, the method advances to 517. At 517, a data item update statement is received from the application. Moving to 519, the optimistic locking information associated with the data item is retrieved from a memory device. Proceeding to 520, an exclusive lock is obtained related to the data item. Advancing to 522, the data item stored at the data store is synchronized with the updated version of the data item based on the optimistic locking information. The method terminates at 524.

According to particular embodiments, an online connection between an application and a database server coupled to a data store is not necessary to perform an update of a data item stored in the data store. Thus, the number of applications that may access a particular database server increases with respect to an optimistic locking feature that utilizes a persistent connection from the time of an initial read to the time of an update. Additionally, optimistic locking information for a particular data item may be retrieved and sent to an application without an explicit request from the application. Therefore, if an application goes offline with respect to a database server, the application can perform an update of the data item without having to re-send an application data request related to the data item.

Particular embodiments can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Further, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and features as defined by the following claims.

What is claimed is:

1. A computer-implemented method, comprising:
   receiving an application data request at a database server from an application executing at a client device, the application data request to retrieve a data item stored at a data store coupled to the database server;
   automatically adding an optimistic locking information request to the application data request, the optimistic locking information request to retrieve optimistic locking information associated with the data item, the optimistic locking information including an identifier of the data item;
   sending the application data request and the optimistic locking information request to the data store;
   retrieving the data item and the optimistic locking information from the data store;
   forwarding the data item and the optimistic locking information to the application;
   determining whether a connection between the client device and the database server is terminated;
   in response to determining that the connection between the client device and the database server is not terminated:
      receiving a data item update statement related to storing an updated version of the data item at the data store from the application; and
      synchronizing the data item stored at the data store with the updated version of the data item based on the optimistic locking information;
   in response to determining that the connection between the client device and the database server is terminated, determining whether the connection has been re-established; and
   in response to determining that the connection has been re-established:
      receiving a data item update statement related to storing an updated version of the data item at the data store from the application;
      receiving the optimistic locking information from the application;
      obtaining an exclusive lock related to the data item; and synchronizing the data item stored at the data store with the updated version of the data item based on the optimistic locking information.

2. The computer-implemented method of claim 1, further comprising:
retrieving the optimistic locking information from the data store by receiving the optimistic locking information at the database server from the data store in response to sending the optimistic locking information request; and
storing the optimistic locking information in a memory device.

3. The computer-implemented method of claim 2, further comprising retrieving the optimistic locking information from the memory device in response to determining that the connection between the client device and the database server is not terminated and in response to receiving the data item update statement.

4. The computer-implemented method of claim 2, wherein the memory device resides at one of the client device, the database server and an application server.

5. The computer-implemented method of claim 1, wherein the optimistic locking information request is automatically sent to the data store in response to receiving the application data request.

6. The computer-implemented method of claim 1, further comprising:
obtaining a shared lock with respect to the data item in response to receiving the application data request; and
obtaining the exclusive lock with respect to the data item in response to receiving the data item update statement from the application.

7. The computer-implemented method of claim 1, wherein the application data request includes at least a string indicating a request to modify the data item via the application.

8. A system, comprising:
a memory;
a processor coupled to the memory;
an enablement interface configured to:
receive an application data request from an application executing at a client device, the application data request configured to retrieve a data item stored at a data store, wherein the data store is coupled to a database server; and
automatically add an optimistic locking information request to the application data request, the optimistic locking information request configured to retrieve optimistic locking information associated with the data item, the optimistic locking information including an identifier of the data item;
a retrieval interface configured to:
send the application data request and the optimistic locking information request to the data store;
retrieve the data item and the optimistic locking information from the data store; and
forward the data item and the optimistic locking information to the application; and
an update interface configured to:
determine whether a connection between the client device and the database server is terminated;
in response to determining that the connection between the client device and the database server is not terminated:
receive a data item update statement related to storing an updated version of the data item at the data store from the application; and synchronize the data item stored at the data store with the updated version of the data item based on the optimistic locking information;
in response to determining that the connection between the client device and the database server is terminated, determining whether the connection has been re-established; and
in response to determining that the connection has been re-established:
receive a data item update statement related to storing an updated version of the data item at the data store from the application;
receive the optimistic locking information from the application;
obtain an exclusive lock related to the data item; and
synchronize the data item stored at the data store with the updated version of the data item based on the optimistic locking information.

9. The system of claim 8, wherein the optimistic locking information includes a time stamp.

10. The system of claim 8, further comprising a first network interface coupled to the client device.

11. The system of claim 10, further comprising a second network interface coupled to the data store.

12. The system of claim 8, wherein the connection between the client device and the database server coupled to the data store is disconnected after receiving the application data request.

13. The system of claim 12, wherein the connection between the client device and the database server is re-established after a period of time.

14. The system of claim 13, wherein the update interface is configured to:
receive the data item update statement from the application after the connection between the client device and the database server is re-established; and
receive the optimistic locking information associated with the data item from the application before synchronizing the data item stored at the data store with the updated version of the data item based on the optimistic locking information.

15. The system of claim 14, wherein the retrieval interface is configured to obtain a shared lock with respect to the data item after receiving the application data request, and wherein the update interface is configured to obtain an exclusive lock with respect to the data item after receiving the data item update statement and the optimistic locking information.

16. The system of claim 12, wherein the connection between the client device and the database server is disconnected after closing the data item in the application.

17. The system of claim 12, wherein the connection between the client device and the database server is disconnected in response to a first termination condition associated with the client device coupled to the database server, in response to a second termination condition associated with an application server coupled to the database server, or in response to a third termination condition associated with the database server.

18. A computer program product comprising a non-transitory computer usable medium including a computer readable program, wherein the computer readable program is executable by a database server to:
receive an application data request from an application executing at a client device, the application data request configured to retrieve a data item stored at a data store coupled to the database server;

add an optimistic locking information request to the application data request, the optimistic locking information request to retrieve optimistic locking information associated with the data item, the optimistic locking information including an identifier of the data item;

send the application data request and the optimistic locking information request to the data store; and in response to determining that a connection between the client device and the database server has been terminated and re-established:

receive a data item update statement related to storing an updated version of the data item at the data store;

receive the optimistic locking information from the application;

obtain an exclusive lock related to the data item; and synchronize the data item stored at the data store with the updated version of the data item based on the optimistic locking information.

19. The computer program product of claim 18, wherein the optimistic locking information includes at least one of a time stamp and a version number.

20. The computer program product of claim 18, wherein the computer readable program is executable by the database server to:

in response to determining that the connection between the client device and the database server is not terminated:

synchronize the data item stored at the data store with the updated version of the data item based on the optimistic locking information.

\* \* \* \* \*